(12) United States Patent
Matthews et al.

(10) Patent No.: US 10,132,501 B1
(45) Date of Patent: Nov. 20, 2018

(54) BARBECUE TOOL APPARATUS

(71) Applicants: Del L. Matthews, Yuma, AZ (US);
Michele Matthews, Yuma, AZ (US)

(72) Inventors: Del L. Matthews, Yuma, AZ (US);
Michele Matthews, Yuma, AZ (US)

( * ) Notice: Subject to any disclaimer, the term of this patent is extended or adjusted under 35 U.S.C. 154(b) by 0 days.

(21) Appl. No.: 15/666,322

(22) Filed: Aug. 1, 2017

(51) Int. Cl.
*A47J 37/07* (2006.01)
*F24B 15/00* (2006.01)
*F24B 1/199* (2006.01)

(52) U.S. Cl.
CPC ........... *F24B 1/199* (2013.01); *A47J 37/0786* (2013.01)

(58) Field of Classification Search
CPC .......... A47J 37/0786; F23J 1/04; F24B 1/199; F24B 15/00; F24B 15/10
USPC .................... 294/9, 10, 11, 12, 24, 26; 7/109
See application file for complete search history.

(56) References Cited

U.S. PATENT DOCUMENTS

| | | | | |
|---|---|---|---|---|
| 1,644,464 A * | 10/1927 | Cain | ...................... | A47J 45/10 220/753 |
| 1,739,347 A * | 12/1929 | Benedict | ................. | A47J 45/10 294/26 |
| 1,791,518 A * | 2/1931 | Woodring | .............. | A01K 97/14 294/26 |
| 2,326,676 A * | 8/1943 | Peters | ..................... | F24B 15/10 294/103.1 |
| 2,362,137 A * | 11/1944 | Kagan | ................... | A47F 5/0006 24/371 |
| 3,006,678 A * | 10/1961 | Johnson | ................. | A01K 97/14 294/26 |
| D354,662 S * | 1/1995 | Brezany | ......................... | 294/26 |
| 5,729,854 A * | 3/1998 | Powers | ............... | A47J 37/0786 294/10 |
| 6,000,739 A * | 12/1999 | Zemit | ..................... | A47J 45/10 126/25 R |
| 6,464,271 B1 * | 10/2002 | Irvin, Jr. | ................ | A47J 43/283 294/26 |
| 6,752,441 B1 * | 6/2004 | Morris | ..................... | A47J 45/10 294/103.1 |
| 7,108,304 B2 * | 9/2006 | White | ................. | A47J 37/0786 294/10 |
| 7,309,088 B2 * | 12/2007 | Fiore | ..................... | E04H 4/1272 294/24 |
| 8,465,068 B1 * | 6/2013 | Vinson, Jr. | .............. | A47J 45/10 294/32 |
| 8,474,891 B2 * | 7/2013 | Shields | ................... | A45F 5/021 224/269 |
| 9,615,696 B2 * | 4/2017 | Picken, Sr. | ............. | A47J 45/10 |

* cited by examiner

*Primary Examiner* — Dean J Kramer
(74) *Attorney, Agent, or Firm* — Donn K. Harms

(57) ABSTRACT

A barbecue tool having a handle with an elongated member having a hook thereon extending from a first end of the handle. Extending from a second end of the handle is a U-shaped member. The hook on the elongated member is adapted for lifting barbecue grates and for holding the tool when not used. The U-shaped member is adapted for stacking charcoal briquette for firing and unshackling the briquettes once heated. The centrally positioned handle provides a grip for the user to use either end of the tool.

6 Claims, 1 Drawing Sheet

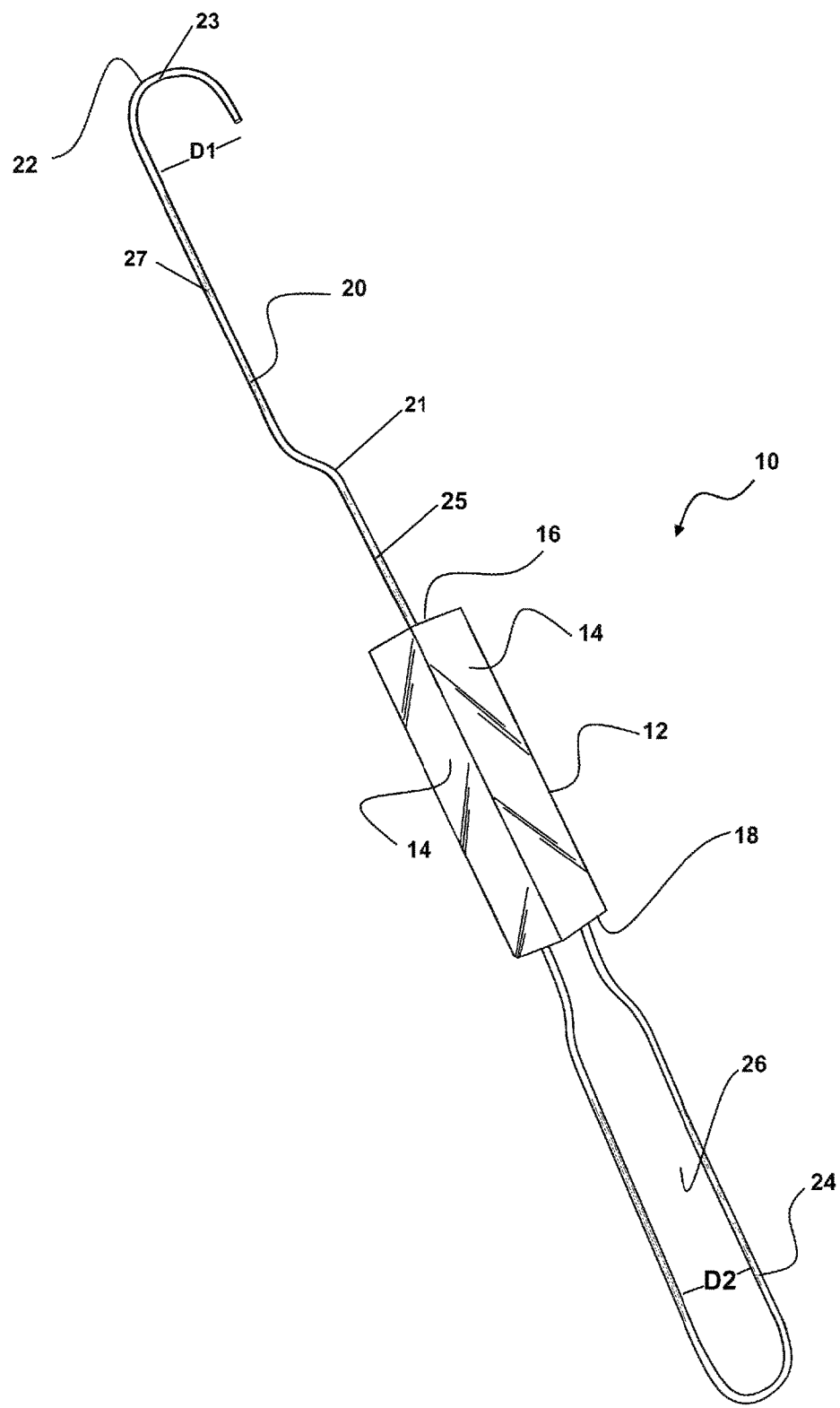

BARBECUE TOOL APPARATUS

FIELD OF THE INVENTION

The present device relates to cooking with a barbecue and the like. More particularly, the disclosed device relates to a multi function barbecue tool adapted with an insulated handle in a central portion, having a grate lifting hook also configured for hanging the tool extending from one end of the handle, and a coal urging component extending in an opposite direction from an opposing end of the centrally located handle.

BACKGROUND OF THE INVENTION

Cooking over a barbecue has been a favorite pastime of many home chefs as well as a culinary art practiced by a large number of well known and local restaurant chefs. Conventionally, charcoal or other briquettes are positioned within the confines of a metal housing and ignited to burn. At a point where the briquettes are not flaming and are akin to glowing coals of a wood fire, food is cooked over the burning briquettes.

In preparation for the cooking of food over the glowing coals, conventionally, the briquettes are fired using an accelerant such as lighter fluid or similar material. This involves forming a stack of the briquettes in a fashion to best confine the heat generated to the stacked briquettes, to thereby communicate the majority of heat generated to the briquettes themselves in the confined stack.

At a point where the cook determines the briquettes are sufficiently self-generating heat which can be employed for food cooking, the briquettes are conventionally spread evenly about a shelf of the barbecue housing. Thereafter, metal grill plates are positioned to cover the area of the briquettes, such that food placed upon the grill plates will be heated by the underlying briquettes for a sufficient duration to cook the food.

During this procedure, the user is generally required to initially stack the briquettes into a confined pile, and once ignited sufficiently, the user must then spread the briquettes evenly into a cooking layer. Once the briquettes are evenly spread in the shelf of the barbecue housing, the user will engage the grill plates operatively with the perimeter edge of the housing such that the perimeter of the grill plates will hold the grill plates elevated a distance above the underlying briquettes providing the heat for cooking.

The device and method herein disclosed, provides a multi function barbecue tool employable by the cook or barbecue user, which is adapted in a central portion with an insulated handle for gripping. Extending away from one end of the handle, along an axis of the handle, is a hook portion formed of a hooked member which is configured in size to engage and lift and lower the grill plates which vary in size and support spacing on many barbecues. During this lifting, the device maintains the hands of the user insulated and a safe distance from the briquette fire as well as the heated grill plates. The member formed to a hook portion is also employable to hold the device during storage in-between uses.

Extending from the opposite end of the insulated handle is a U-shaped member portion of the tool. This U-shaped portion is formed by a curvilinear member extending in a U-Shape from a first end engaged with the handle to a second end engaged to the handle. This portion of the tool is sized for employment in stacking and unstacking the charcoal briquettes employed to provide the cooking heat to food placed upon the grill plates.

The forgoing examples of barbecues and the firing of briquettes and placement of grill plates, and the limitations related therewith, are intended to be illustrative and not exclusive. The disclosed examples and background does not imply any limitations on the invention described and claimed herein. Various other limitations of the related art in barbecues are known, or such will become apparent to those skilled in the art upon a reading and understanding of the specification below and the accompanying drawings.

SUMMARY OF THE INVENTION

The device and system herein disclosed and described provides a solution to the shortcomings in prior art in the area of barbecues and the tasks involved in firing the briquettes prior to use, as well as the spreading of briquettes and grill placement thereover, subsequently.

The disclosed device provides an improved barbecue tool which is employable by a user to remove grill plates and stack briquettes prior to igniting the briquettes. It is also employable by the user to thereafter spread the heat-radiating briquettes in an even layer about a barbecue housing. It may further be used to engage and lift the metal grill plates into engagements with the barbecue housing to properly position the grill plates above and spaced from the underlying briquettes.

Removal and re-engagement of grill plates from their removably engaged positions upon the barbecue housing is easily accomplished using a hook shaped member extending from a centrally located handle. The hook-shaped member is preferably formed of metal or similar material which will not burn or melt at the high heat and flame levels found in a barbecue. The hook, at the distal end of the axially disposed hook-shaped member, has a diameter adapted to slip through the open spaces of a barbecue grill plate used to cook food above the flaming briquettes. The hook also provides an engagement to hang the device when not in use.

The handle itself is centrally located between the distal end of the hook shaped member extending from a first side of the handle, and a U-shaped member extending from the opposite side of the handle. The handle is preferably formed of an insulating material which will prevent transmission of heat from the metal hook shaped member and U-shaped member, to the hand of the user holding it. Such is preferably wood, or silicone, or a polymeric material which will not burn easily in the presence of high heat and flame encountered with a barbecue.

A preferred shape for the handle will have multiple planar portions running around the exterior perimeter of the handle. For example, a rectangular or square handle will have four planar sides which provide the user a secure grip thereon. Of course other pluralities of planar sides may be employed such as a five or six sided handle, if such is more comfortable for users. Alternatively, but not as preferred due to the potential for rotational slippage in the grip of the user, is a round or generally curved exterior circumference of the handle. When picking up a heavy grate, for some users the curved exterior perimeter of a handle might tend to slip and rotate in the grip of the user. In experimentation, such was not found where adjacent planar sides were used, and longer sides are preferred.

Engaged at a first end to the opposite side of the centrally located handle is the U-shaped member portion of the tool. As noted, the U-shaped portion is provided by a curvilinear member extending in a substantially U-Shape from a first end engaged with the handle, to a distal end. This portion of the tool is employable for stacking and unstacking the briquettes which are used to provide the cooking heat to food placed upon the grill plates.

With respect to the above description, before explaining at least one preferred embodiment of the clothing hanger disclosed and described herein in detail, it is to be understood that the barbecue tool invention is not limited in its application to the details of construction and to the arrangement of the components in the following description or illustrated in the drawings. The device herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other barbecue tools and implements for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of the present invention to provide a barbecue tool which is configured with an insulated handle for gripping in a central portion and which has tool portions extending from both sides of the handle which may be employed by the user for multiple tasks.

These and other objects, features, and advantages of the disclosed barbecue tool invention, as well as the advantages thereof over existing prior art, which will become apparent from the description to follow, are accomplished by the improvements described in this specification and hereinafter described in the following detailed description, which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed barbecue tool device. It is intended that the embodiments and FIGURES disclosed herein are to be considered illustrative of the invention herein, rather than limiting in any fashion.

In the drawings:

FIG. 1 depicts a perspective view of the device herein showing a centrally located insulated handle and a hooked member extending from a first end of the handle and U-shaped member extending from the second end.

DETAILED DESCRIPTION OF THE INVENTION

In this description, the directional prepositions of up, upwardly, down, downwardly, front, back, top, upper, bottom, lower, left, right and other such terms of direction or position, refer to the device as it is oriented and appears in the drawings and are used for convenience only, and such are not intended to be limiting or to imply that the device has to be used or positioned in any particular orientation.

Now referring to drawings in FIG. 1 wherein similar components are identified by like reference numerals, there can be seen in FIG. 1 a depiction of the barbecue tool device 10 herein.

As shown, the device 10 features a centrally located handle 12 which is preferably formed with a plurality of planar intersecting sides 14. Preferably a handle 12 with at least three planar sides 14 or four planar sides 14 is provided as it was found in experimentation, that employment of planar sides 14 provided a good grip for the user which resisted rotation during use. The handle 12 extends a length of 4-6 inches between a first end 16 and a second end 18.

Additionally, while the handle 12, in experimentation, was formed also of silicone and flame resistant plastic which provided a similar good grip, the propensity of some plastics to burn and not be easily extinguished, and of silicone to melt if left too close to the heat, has made wood the preferred material because it was found it provided excellent heat insulation and users apparently being aware of the fact that wood burns, were more careful in their placement of the handle 12 when not using it.

At the first end 16 of the handle 12 is engaged a first end of an elongated member with a hook 22 at a second end, or hook-shaped member 20. The hook shaped member 20 has a first end extending along an extension of an axis of the handle 12 to a second end formed as a hook 22. Currently, a fixed engagement to the first end 16 of the handle 12 is preferred to help the user balance grates engaged to the hook 22 as it was found a rotating engagement made balancing harder.

The hook shaped member 20 is formed of metal such as stainless steel or similar material which will not burn or melt at the high heat and flame levels found in a barbecue. It was found that a 308 gauge material provided sufficient stiffness and strength to lift even heavy cast iron grates, while maintaining the light weight of the device 10.

It was also found in experimentation that the diameter of the hook shaped member 20, provided by a 308 gauge stainless steel member material at the hook 22, end is such that it will slip through the open spaces of the widest variety of barbecue grill plates used to cook food above the flaming briquettes. Conventional grates can have an opening between ⅛ to ⅜ inches. The hook 22 as noted, in addition to removably engaging grill plates, also is employable to hang the device 10 for storage when not in use.

Additionally, it was found after experimentation, that the diameter D1 of the opening between the distal end of the hook 22 and the linear portion of the hooked member 20 of between 1.5 to 1.7 inches, worked best to allow the hook 20 to engage one or a plurality of grate members in a conventional cooking grate. These grates vary widely in the gaps between the members forming the grate, as well as the width of those members. After multiple changes during experiments in lifting differing grates formed of both thin steel and cast iron with differing spacings, this gap diameter D1 range, noted above, worked best to allow an easy engagement. Narrower and wider dimensions for the gap failed to easily connect over the members in the grate. Further, using a 308 gauge stainless wire for the hook shaped member 20 allowed for a diameter of the hook shaped member 20 to easily slip through even the narrowest of gaps in such grates, and then allow the hook 22 to be rotated to a position to engage over one, or preferably a plurality of members forming the grate.

Still further, it was found that forming a bend 21 in the hook shaped member 20, in a central portion, between the engagement of the first end of the hook shaped member 20 with the first end 16 of the handle 14, and the hook 22 at the second end, aligned a center area 23 of the hook 22 with the axis of the of the handle 12. This axis of the handle 12, while not shown, extends from the handle 12 along a first portion 25 of the hook shaped member 20, between the first end 16 of the handle 12 and the bend 21. A second portion 27 of the hook shaped member 20 extends between the bend 21 and the hook 22 in a substantially parallel path with the first portion 25.

This bend 21 is particularly preferred as it was found that it helps balance the load of the weight of grates for the user holding the handle 12, which was much harder without the bend 21. The bend 21 is located approximately one third of the distance of the total length of the hook shaped member 20, from the handle 12.

From an engagement at the second end 18 of the handle 12, extends the U-shaped member 24 portion of the device 10. This U-shaped member 24 has a gap 26 between the two curvilinear portions of the U-shaped member 24. The gap 26 has a diameter D2 which is preferably between 2-2.75 inches which was found to best enable the device 10 to stack and spread charcoal briquettes. The diameter D2, works best with most conventional charcoal briquettes when formed to a distance of 2.1-2.2 inches. However, for larger briquettes a diameter D2 can be on the larger end of the scale. If formed of malleable metal material, portions of the gap D2 can be made smaller or larger by bending the parallel portions of the U-shaped member. In use in this configuration as noted, the U-shaped member 24 is employable for stacking and unstacking the charcoal briquettes which used to provide the cooking heat to food placed upon the grill plates.

It should be noted than any of the different depicted and described configurations and components of the barbecue tool device herein, can be employed with any other configuration or component shown and described as part of the device herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A barbecue tool comprising:
   a handle extending a handle length between a first end and a second end, said handle length being at least four inches;
   an elongated member engaged at a first end thereof, to said first end of said handle;
   said elongated member extending a length to a hook formed at a second end of said elongated member;
   a U-shaped member extending from an engagement of a first end thereof, to said second end of said handle;
   said U-shaped member having two parallel sides having a gap therebetween;
   each of said two parallel sides of said U-shaped member having a length extending between said second end of said handle to a curved distal end of said U-shaped member; and
   said length of said two parallel sides extending from said second end of said handle to said curved distal end, being longer than said handle length.

2. The barbeque tool of claim 1, additionally comprising:
   said length of said elongated member being longer than said handle length.

3. The barbeque tool of claim 2, additionally comprising:
   a first portion of said elongated member extending between said first end of said handle and a bend;
   a second portion of said elongated member extending parallel to said first portion of said elongated member between said bend and said hook; and
   said first portion of said elongated member being aligned with an axis of said handle and a central area of said hook.

4. The barbecue tool of claim 2, wherein said hook has a diameter running between a tip of said hook and said second portion of said elongated member; and
   said diameter being between 1.5 to 1.7 inches.

5. The barbecue tool of claim 2, wherein said gap between said two parallel sides of said U-shaped member is between 2.0-2.75 inches.

6. The barbeque tool of claim 1, additionally comprising:
   a first portion of said elongated member extending between said first end of said handle and a bend;
   a second portion of said elongated member extending parallel to said first portion of said elongated member between said bend and said hook; and
   said first portion of said elongated member being aligned with an axis of said handle and a central area of said hook.

* * * * *